US 8,849,356 B2

(12) United States Patent
Chi et al.

(10) Patent No.: US 8,849,356 B2
(45) Date of Patent: Sep. 30, 2014

(54) MOBILE DEVICE DISPLAYING INSTANT MESSAGE AND CONTROL METHOD OF MOBILE DEVICE

(75) Inventors: Jumin Chi, Busan (KR); Yeaeun Kwon, Yongin (KR)

(73) Assignee: LG Electronics Inc., Seoul (KR)

( * ) Notice: Subject to any disclaimer, the term of this patent is extended or adjusted under 35 U.S.C. 154(b) by 38 days.

(21) Appl. No.: 13/367,224

(22) Filed: Feb. 6, 2012

(65) Prior Publication Data

US 2013/0012271 A1   Jan. 10, 2013

(30) Foreign Application Priority Data

Jul. 5, 2011   (KR) .................. 10-2011-0066596

(51) Int. Cl.
*H04B 1/38* (2006.01)
*H04M 1/725* (2006.01)

(52) U.S. Cl.
CPC ...... *H04M 1/72547* (2013.01); *H04M 1/72544* (2013.01); *H04M 2250/22* (2013.01)
USPC .......... 455/566; 455/466; 455/73; 455/550.1; 345/536; 345/534; 345/535

(58) Field of Classification Search
USPC .......... 455/566, 466, 73, 550.1; 345/536, 1.1, 345/1.2, 1.3, 2.1, 2.2, 2.3, 534, 535
See application file for complete search history.

(56) References Cited

U.S. PATENT DOCUMENTS

| 8,458,597 | B1* | 6/2013 | Tijssen .......................... 715/748 |
| 2006/0069990 | A1 | 3/2006 | Yozell-Epstein et al. |
| 2008/0028323 | A1* | 1/2008 | Rosen et al. .................. 715/752 |
| 2009/0005072 | A1* | 1/2009 | Forstall et al. ............. 455/456.1 |
| 2009/0106686 | A1 | 4/2009 | Shin et al. |
| 2009/0176517 | A1* | 7/2009 | Christie et al. ................ 455/466 |
| 2009/0244019 | A1* | 10/2009 | Choi ............................. 345/173 |
| 2011/0197145 | A1* | 8/2011 | Huang et al. .................. 715/752 |

FOREIGN PATENT DOCUMENTS

| WO | 2008011629 | 1/2008 |
| WO | 2011055013 | 5/2011 |

OTHER PUBLICATIONS

European Patent Office Application Serial No. 11195934.2, Search Report dated Oct. 1, 2012, 6 pages.
European Patent Office Application Serial No. 11195934.2, Office Action dated Jan. 27, 2014, 4 pages.

* cited by examiner

*Primary Examiner* — Tuan Pham
(74) *Attorney, Agent, or Firm* — Lee, Hong, Degerman, Kang & Waimey

(57) ABSTRACT

The present invention relates to a mobile terminal displaying an instant message and a control method of the same. A mobile terminal according to an aspect of the invention may include: a wireless communication unit sending or receiving an instant message; a display unit including a first region and a second region and displaying the instant message sent or received by the wireless communication unit on the first region; and a controller displaying information corresponding to at least one object included in the instant message on the second region.

24 Claims, 13 Drawing Sheets

FIG. 5
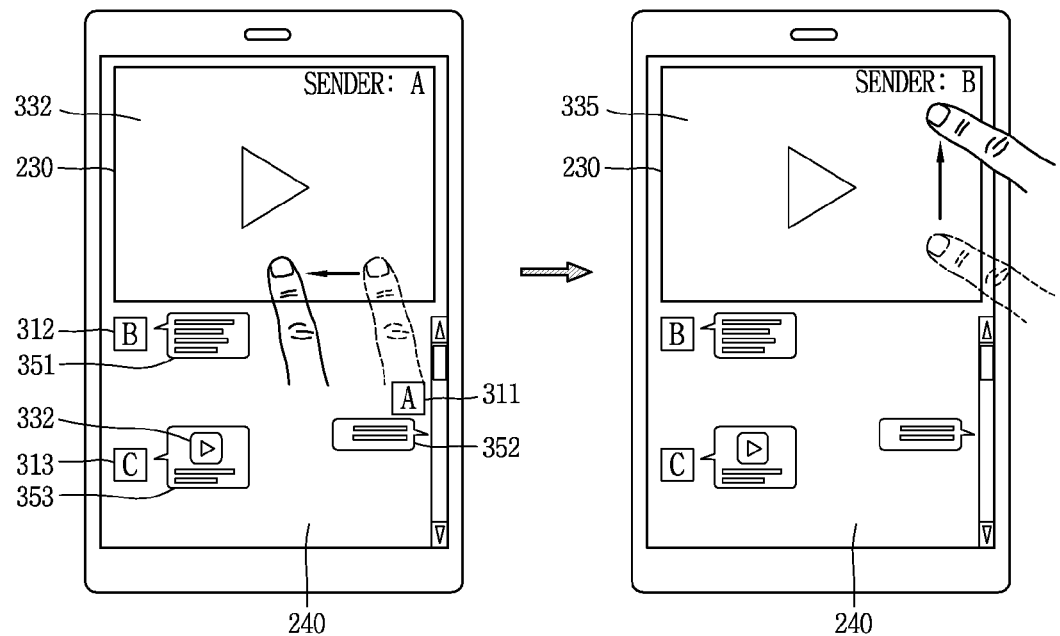
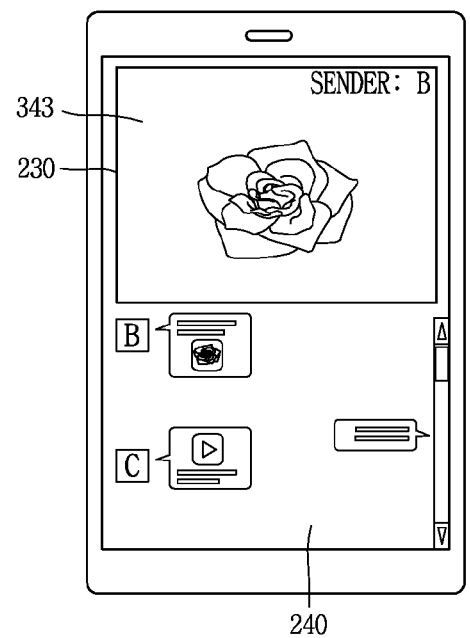

MOBILE DEVICE DISPLAYING INSTANT MESSAGE AND CONTROL METHOD OF MOBILE DEVICE

CROSS-REFERENCE TO RELATED APPLICATIONS

Pursuant to 35 U.S.C. §119(a), this application claims the benefit of earlier filing date and right of priority to Korean Application No. 10-2011-0066596, filed on Jul. 5, 2011, the contents of which is incorporated by reference herein in its entirety.

BACKGROUND OF THE INVENTION

1. Field of the Invention

The present invention relates to a mobile terminal displaying an instant message and a control method of the same.

2. Background of the Invention

A mobile terminal is a portable electronic device that has at least one of voice and video call function, information input/output function, and data storage function.

In line with the diversification of functions, mobile terminals have been manufactured in the form of multimedia players that have complex functions including capturing images or videos, playing music or video files, games, broadcast reception, and Internet connection.

New, various attempts have been made by hardware or software to implement the complex functions of these multimedia players.

In order to support and increase the functions of mobile terminals, the improvement of the structural and or software aspect of terminals may be considered.

When a user tries to re-use an object such as an image or a video that is included in an instant message exchanged in the past by using a mobile terminal, the user feels uncomfortable finding the object because part including the object is not separately displayed.

SUMMARY OF THE INVENTION

Therefore, an aspect of the detailed description is to provide a mobile terminal allowing a user to conveniently use an attached file including an image or a video included in an instant message, and a control method of the same.

To achieve these and other advantages and in accordance with the purpose of this specification, as embodied and broadly described herein, according to an aspect of the present invention, there is provided a mobile terminal including: a wireless communication unit sending or receiving an instant message; a display unit including a first region and a second region and displaying the instant message sent or received by the wireless communication unit on the first region; and a controller displaying information corresponding to at least one object included in the instant message on the second region.

The mobile terminal may include a detector detecting at least one object included in the instant messages, wherein the object detected by the detector is an image, an audio, a movie or a text containing link information.

The controller may display information corresponding to the object, detected by the detector, on the second region, and a first icon, based on the object detected, on the second region.

The controller may output an object corresponding to at least one piece of information selected by a user from the information displayed on the second region and an instant message related to the object to the first region.

The first region may include a third region and a fourth region, the object corresponding to the information selected by the user may be output to the third region, and the instant message related to the object may be displayed on the fourth region.

The display unit may support touch input, and the object output to the third region may be changed to another object on the basis of touch input sensed in the third region.

The controller may group the object corresponding to the information displayed on the second region according to at least one of specifications including a format of the object, sending or receiving order, and a sender or receiver, and a change of the object output to the third region may be made within the same group.

The controller may change the instant message displayed on the fourth region to an instant message related to the changed object on the basis of the change of the object output to the third region.

A size of the third or fourth region may be changed according to a user's setup, when a change is made to a size of one of the third and fourth regions, the other region may change according to the change, and when the size of the third or fourth region changes more than a predetermined range, the instant message displayed on the fourth region may be displayed to overlap with the third region.

The controller may change an output range of the display unit to display the instant message related to the object on the first region, and the controller may change the output range of the display unit to display a new instant message when the new instant message is sent or received.

The controller may display a second icon on the display unit to indicate that the new instant message is sent or received, and the controller may change the output range of the display unit when the second icon displayed is selected by the user.

The controller may output an object corresponding to one piece of information selected by a user from the information displayed on the second region to the first region, and overlap an instant message related to the object with the object output to the first region.

The controller may overlap the instant message related to the object with transparency to make the object output to the first region distinguishable.

The information displayed on the second region may include a keyword, and the keyword may be included in the object corresponding to the information or input by a user.

The controller may send the object corresponding to the keyword to a predetermined terminal when a text input by the user coincides with the keyword.

The controller may send a predetermined terminal an object corresponding to at least one piece of information selected by a user from the information displayed on the second region.

A region in which an instant message input by the user is displayed may be displayed on the display unit, and when at least one piece of information from the information displayed on the second region is dragged to the region on the basis of touch input, an object corresponding to the at least one piece of information dragged may be sent to the predetermined terminal.

The information displayed on the second region may be arranged on the basis of at least one of sending or receiving order of the object included in the instant message, a format, and a sender or receiver.

A third icon representing a sender writing the instant message may be displayed on the first region, and the information corresponding to the at least one object sent by the sender may be displayed on the second region when the third icon is selected by a user.

The third icon may be information corresponding to the object sent by the sender.

According to another aspect of the present invention, there is provided a user interface of a mobile terminal having a display unit displaying an instant message, the user interface including: a first region provided in the display unit and displaying an instant message sent or received; and a second region displaying information corresponding to at least one object included in the instant message, the second region separate from the first region.

When at least one piece of information is selected by a user from the information displayed on the second region, at least one of an object corresponding to the selected information and an instant message related to the object may be displayed on the first region.

The display unit may support touch input, and when the at least one piece of information from the information displayed on the second region is dragged to the first region by the user, the instant message corresponding to the information dragged may be displayed on the first region.

The object may be an image, an audio, a video, or a text containing link information, and a first icon based on the object may be displayed on the second region.

Information corresponding to a first icon on which touch input is sensed among first icons displayed on the second region may be displayed, and the information may include at least one of an attribute of the object corresponding to the first icon, sender data, and sent date and time.

According to another aspect of the present invention, there is provided a control method of a mobile terminal having a display unit including a first region and a second region, the control method including: displaying an instant message sent or received, on the first region; detecting at least one object included in the instant message; and displaying an icon corresponding to the detected object on the second region.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 5 is a conceptual view illustrating a method of changing objects in a mobile terminal according to an exemplary embodiment disclosed in this specification;

DETAILED DESCRIPTION OF THE INVENTION

Figure 1:
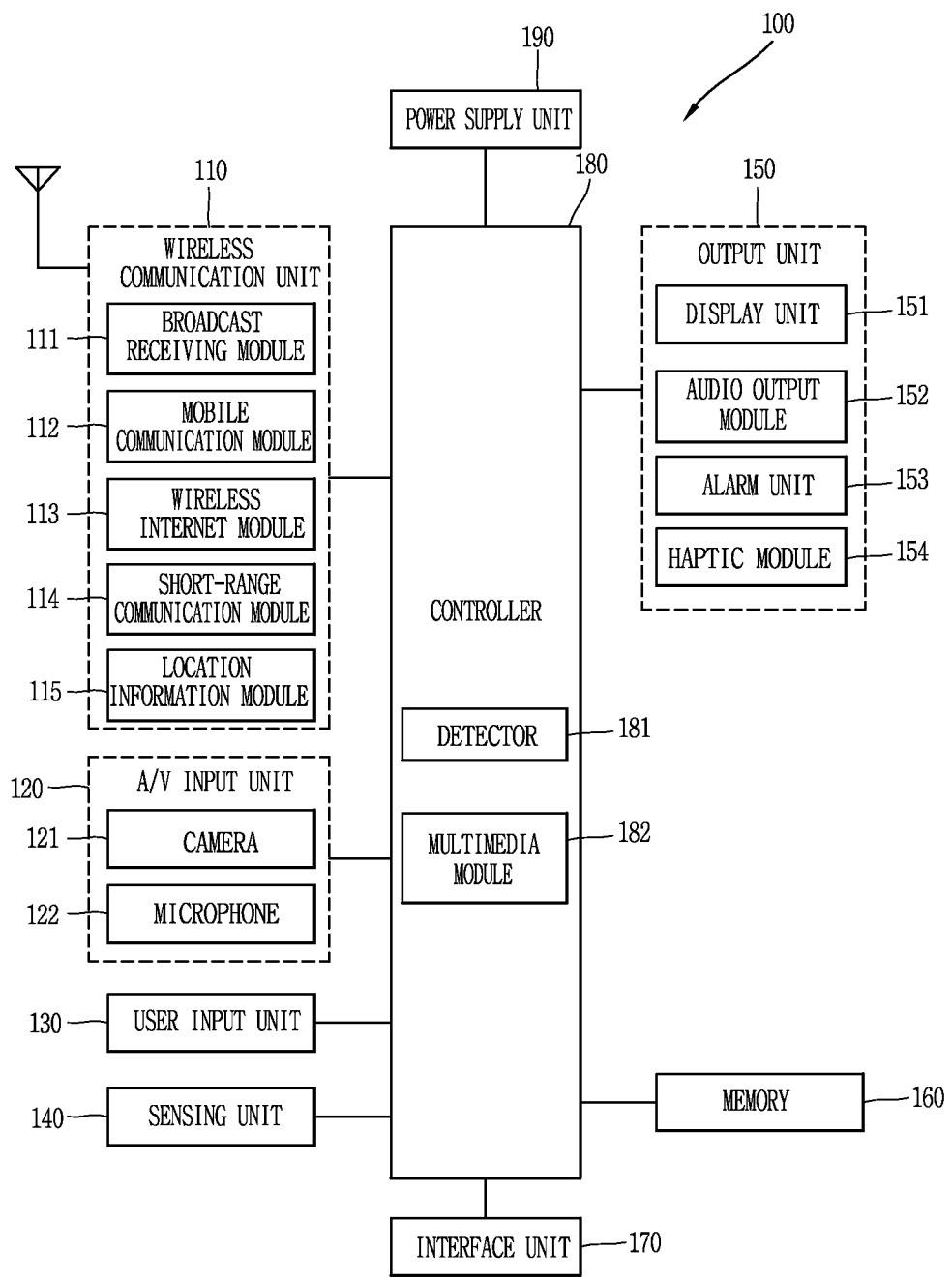
FIG. 1 is a block diagram illustrating a mobile terminal according to an exemplary embodiment of the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings The suffixes attached to components of the mobile terminal, such as 'module' and 'unit or portion' were used for facilitation of the detailed description of the present disclosure. Therefore, the suffixes do not have different meanings from each other. The same reference numerals will be given to the same components as those of the aforementioned embodiment, and their explanations will be omitted. The singular expression of the present disclosure may include a plural concept unless distinctively differently defined.

The mobile terminal according to the present disclosure may include a portable phone, a smart phone, a laptop computer, a digital broadcasting terminal, Personal Digital Assistants (PDA), Portable Multimedia Player (PMP), a navigation system, etc., and a fixed terminal such as a digital TV, a desktop computer, etc.

FIG. 1 is a block diagram of a mobile terminal according to one embodiment of the present disclosure.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190 and the like.

FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives a broadcast signal and/or broadcast associated information from an external broadcast managing entity via a broadcast channel.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT- LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as a part of the alarm unit 153.

The haptic module 154 generates various tactile effects which a user can feel. A representative example of the tactile effects generated by the haptic module 155 includes vibration. Vibration generated by the haptic module 155 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 182 which provides multimedia playback. The multimedia module 182 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The controller 180 may display information corresponding to an object included in an instant message that is displayed on the display unit 151 on the display unit 151.

Here, instant messaging is also called a messenger that allows real-time text communication between two or more people using a network such as the Internet. The other person gets an instant message immediately on a screen, thereby allowing real-time communication as in a phone.

The controller 180 has a detector 181 in order to detect the object included in the instant message displayed on the display unit 151.

The detector 181 detects at least one object included in the instant message. The object comprises at least one of an image, an audio, a video, and a text containing link information.

Once the object is detected by the detector 181, the controller 180 displays a first icon showing information corresponding to the detected object on a first region of the display unit 151.

A method of detecting an object in a mobile terminal in connection with the present invention and displaying information corresponding to the detected object by the controller 180 and the detector will now be described through examples 181 with reference to FIGS. 2 and 3.

Figure 2:
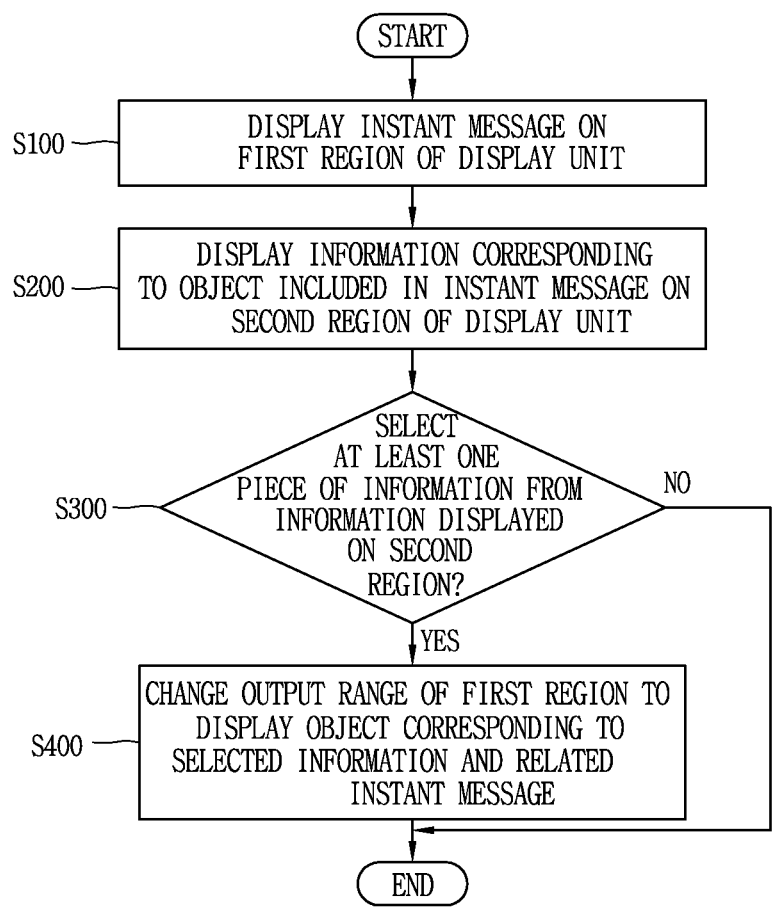
FIG. 2 is a flowchart illustrating a control method of a mobile terminal according to an exemplary embodiment disclosed in this specification.

FIG. 2 is a flowchart illustrating a control method of a mobile terminal according to an exemplary embodiment disclosed in this specification. FIG. 3 is a conceptual view illustrating the control method.

A mobile terminal according to an exemplary embodiment of the present invention has the display unit 151 (see FIG. 3) arranged on one face, for example, a front face, and the display unit 151 supports touch input.

According to the above-described control method, first, an instant message is displayed on a first region 210 (see FIG. 3) of the display unit 151 in operation S100.

This instant message may be sent or received through a messenger provided in the mobile terminal according to the exemplary embodiment of the invention or a messaging application (such as KakaoTalk, Daum MyPeople, or WhatsApp) downloaded to the mobile terminal. The instant message may be sent or received between two people or among more than two people in a group chat.

Figure 3:
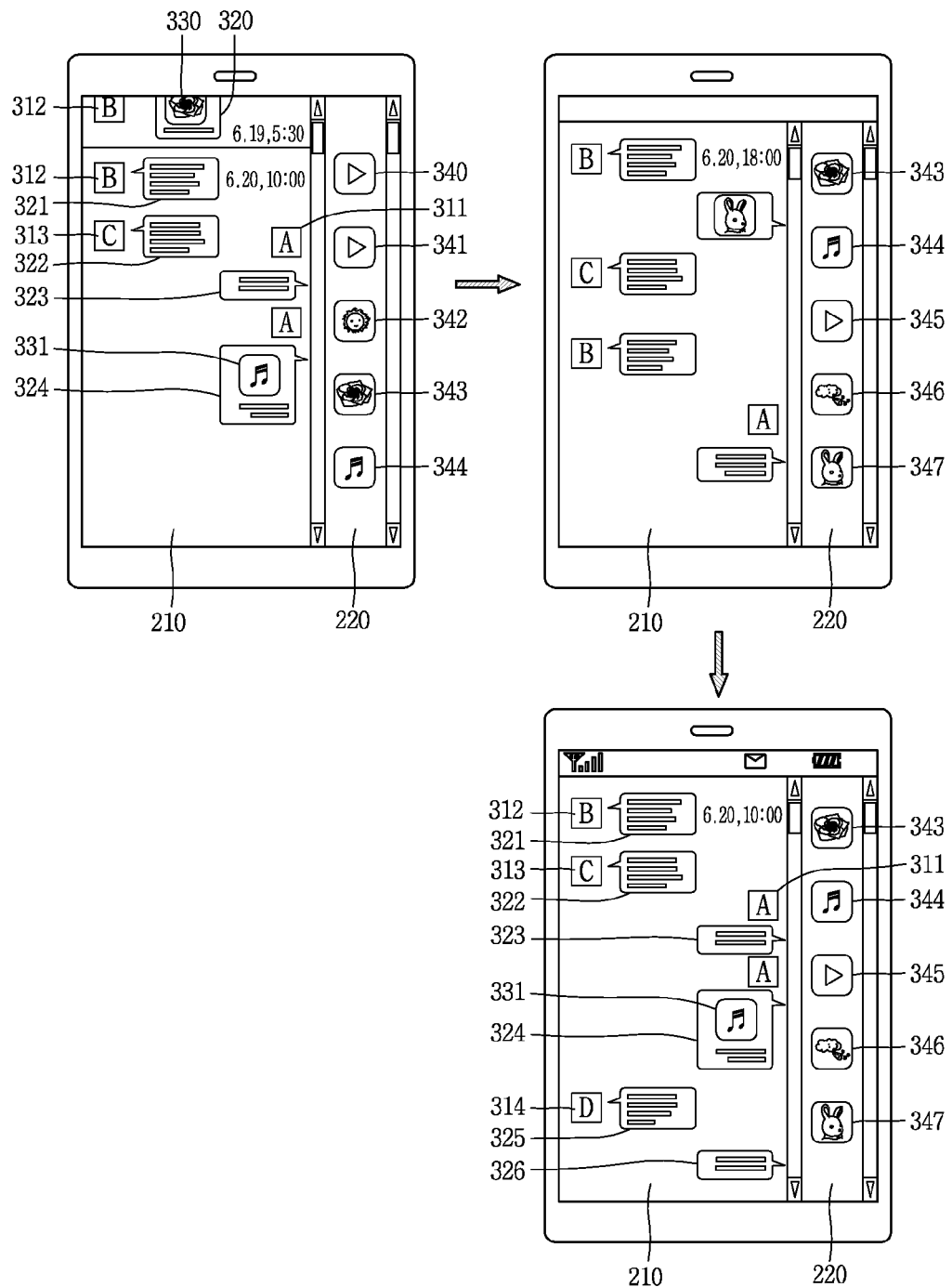
FIG. 3 is a conceptual view illustrating a control method of a mobile terminal according to an exemplary embodiment disclosed in this specification.

Referring to FIG. 3, instant messages displayed on the display unit 151 according to the exemplary embodiment of the invention may be sent or received by a plurality of chat partners A, B, and C 311, 312, and 313.

As described above, when instant messages 320 to 324 are displayed on the first region 210 of the display unit 151 in operation S100 (see FIG. 2), the controller 180 displays information corresponding to at least one of the objects included in the instant messages on a second region 220 of the display unit 151 in operation S200. In this case, the detector 181 included in the controller 180 detects the objects included in the instant messages displayed on the first region 210.

As such, with reference 3, the display unit 151 includes the first region 210 and the second region 220. The instant messages 320 to 324 are displayed on the first region 210, while information corresponding to the objects included in the instant messages displayed on the first region 210 is displayed on the second region 220.

Here, the object comprises an image, a video, an audio, or a text containing link information. For example, these objects are transmitted by the chat partners A, B, and C and are displayed along with the instant messages displayed on the first region 210.

For example, as shown in FIG. 3, the objects may include an image 330 that is included in the instant message 320 sent by the chat partner B 312 and an audio file 331 that is included in the instant message 324 sent by the chat partner A 311.

In addition, information displayed on the second region 220 corresponds to the object in the first region 210. When the object is an image or a video, the information may be a thumbnail image.

When the object is a text containing link information, information displayed on the second region 220 may be image information of a web page corresponding to the link information. If the object is audio, information corresponding to the object may be displayed as an icon such as a musical note.

For example, as shown in FIG. 3, the controller 180 (see FIG. 1) may display the image object 330 included in the instant message 320, sent by the chat partner B 312 on the first region 210, on the second region 220 by using an image icon 343 corresponding to the image object 330.

As such, first icons 340 to 347 that represent the objects included in the first region 210 are displayed on the second region 220, thereby providing various information about the instant messages to the user of the mobile terminal according to the exemplary embodiment of the invention.

Once information corresponding to the objects included in the instant messages is displayed on the second region 220 of the display unit 151 in operation S200, the controller 180 determines whether at least one piece of information is selected by the user from the information displayed on the second region 220 in operation S300.

During the determination process in operation S300, when at least one piece of information is not selected from the information displayed on the second region 220 (see FIG. 2), the controller 180 keeps detecting the objects displayed on the instant messages included the first region 210 and displays information corresponding thereto on the second region 220.

In addition, when at least one piece of information is selected from the information displayed on the second region 220, the controller 180 changes an output range of the first region 210 so that the object corresponding to the selected information and the instant messages related to the object can be displayed on the display unit 151 in operation S400.

A method of displaying the instant messages and the object corresponding to the information selected by the user from the information displayed on the second region 220 will be described through an example.

Referring to FIG. 3, the instant messages 321 to 324 displayed on the first region 210 are sent by the chat partners A, B, and C (311, 312, and 313) on "June 20 around 10 a.m." The controller 180 displays a first icon 344 that represents information corresponding to the audio object 331, included in the instant message 324 sent by the chat partner A 311 among the instant messages 321 to 324, on the second region 220.

While conversation among the chat partners A, B and C (311, 312, and 313) is ongoing, for example, the first icon 344 corresponding to the audio object 331 sent by the chat partner A 311 on "June 20 around 10 a.m." among the first icons displayed on the second region 220 is selected by the user on "June 20 around 6 p.m."

The controller 180 then changes the output range of the first region 210 to a region in which the instant messages sent on "June 20 around 10 a.m." are displayed, so that the instant message related to the first icon 344 can be displayed on the first region 210.

As a result, the instant messages 321 to 326 sent on "June 20 around 10 a.m." are displayed on the first region 210, and the user can check the instant messages related to the first icon 344, selected from the second region 220, on the first region 210.

In this case, the controller 180 sets one chat unit (for example, cluster unit) when time intervals at which the instant messages are sent are shorter than a predetermined amount of time, and changes the output range of the first region 210 to display instant messages that belong to the same chat unit as the instant message corresponding to the selected first icon.

In addition, the controller 180 may display the instant message corresponding to the beginning of the chat unit on the top of the first region 210 and display the instant message 324 corresponding to the first icon 344 selected by the user on the top of the first region 210.

Therefore, the mobile terminal according to the embodiment of the invention displays the object selected by the user along with the related instant messages, thereby providing the user with relevant information.

Meanwhile, the above-described control method is applicable to a user interface that is used for the user to control the mobile terminal by touch input in order to exchange information between the user and the mobile terminal according to the embodiment of the invention. Thus, the detailed description of the user interface will be omitted.

A method of displaying the object corresponding to the first icon, selected by the user in the second region 220, to be separate from the instant messages will now be described in connection with FIGS. 4A to 4C.

Figure 4A:
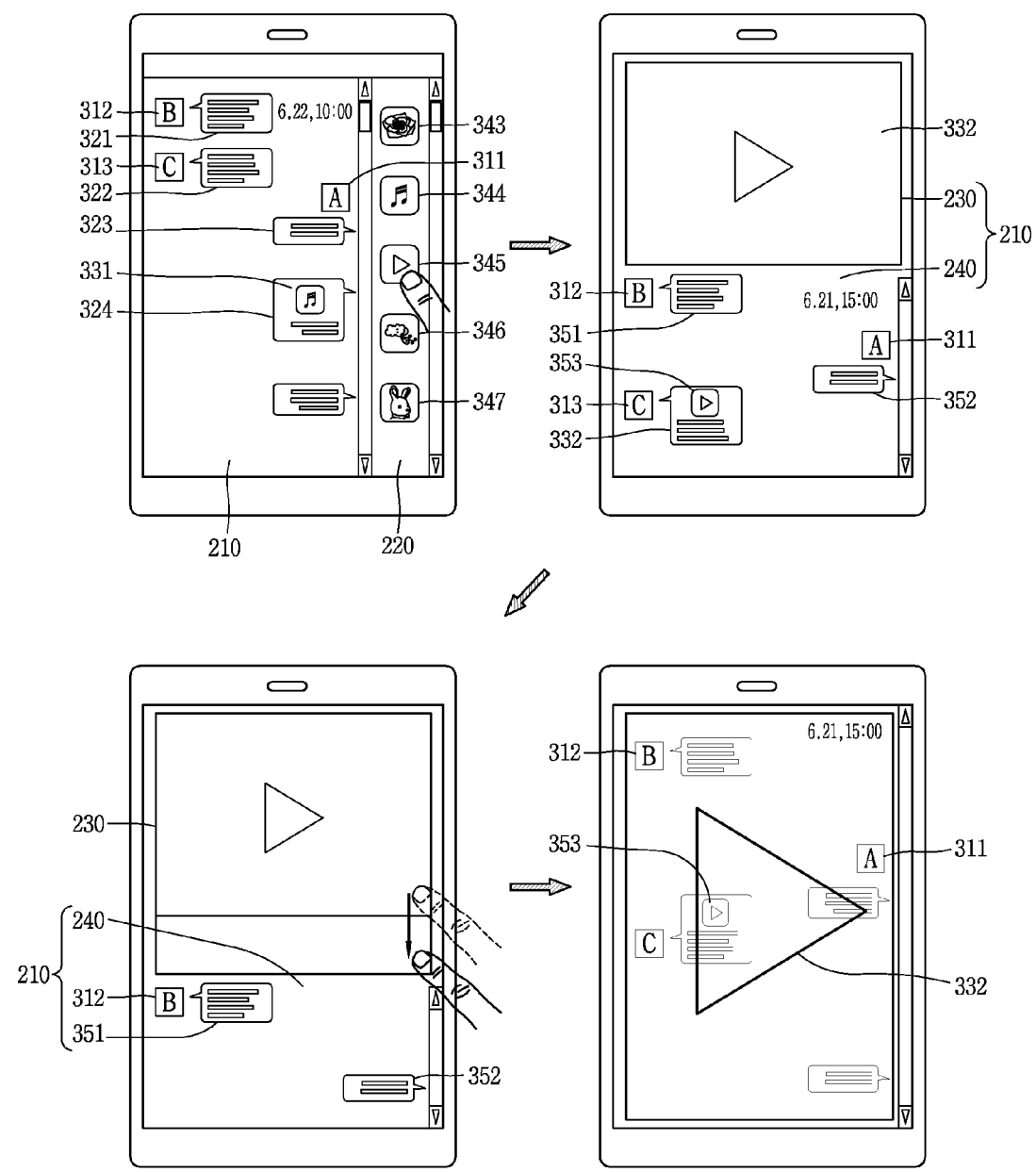
FIGS. 4A through 4C are conceptual views illustrating a method of displaying objects in a mobile terminal according to an exemplary embodiment disclosed in this specification.
Figure 4B:
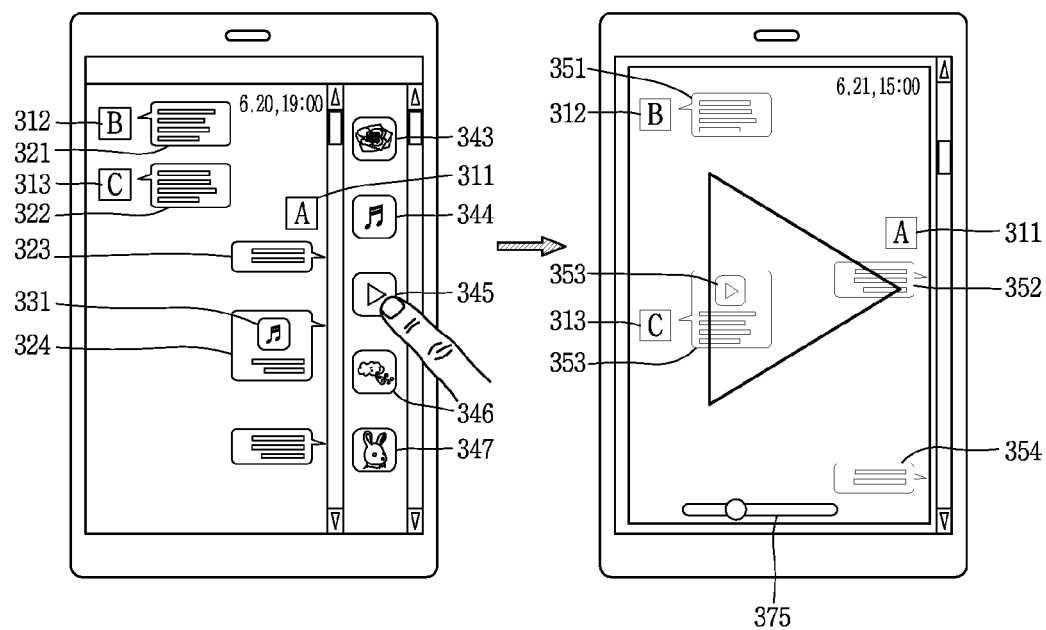
Figure 4C:
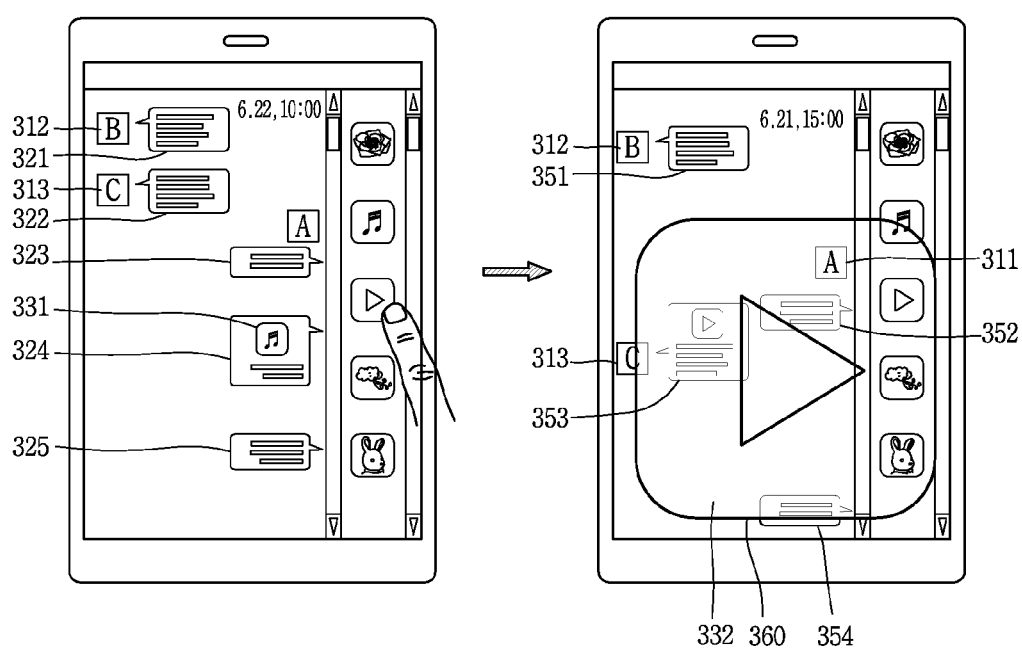

FIGS. 4A to 4C are conceptual views illustrating a method of displaying an object in a mobile terminal according to the exemplary embodiment disclosed in this specification.

As described above, information corresponding to the objects included in the instant messages displayed on the first region 210, for example, one first icon 345 is selected in the second region 220 on which the first icons are displayed. The controller 180 (see FIG. 1) then changes the output range of the first region 210 to display instant messages 351 to 353 related to the selected information on the first region 210.

Also, the controller 180 displays the object corresponding to the first icon 345 to be separate from the instant messages 351 to 353. Various examples are present as a displaying method through division??

First, referring to FIG. 4A, the controller 180 divides the first region 210 into a third region 230 on which a video object 332 corresponding to the first icon 345 is displayed and a fourth region 240 on which an instant message related to the video object 332 is displayed. Here, the first icon 345 is selected by the user among the first icons displayed on the second region 220.

Therefore, as shown in FIG. 4A, the video object 332 corresponding to the first icon 345 selected is output to the third region 230, while the instant messages 351 and 352 that belong to the same chat unit as the instant message 353 including the video object 332 are displayed on the fourth region 240.

When the object corresponding to the first icon displayed on the second region 220 is an audio object, the controller 180 does not divide the first region 210 into the third region 230 and the fourth region 240 but may display the instant message alone on the first region 210 and immediately output the audio object.

In addition, when the object corresponding to the first icon displayed on the second region 220 is a text containing link information, the controller 180 may cause a web browser to be output to the third region 230 to display a web page corresponding to the link information on the third region 230.

Therefore, the controller 180 causes the objects, included in the instant messages, to be displayed on the third region 230, so that the user can conveniently use the objects.

In addition, the size of the third region 230 may be automatically changed according to attribute information of an object to be output. Alternatively, according to user setup, for example, the size of the third region 230 may be controlled by dragging the third region 230 by touch input.

In this case, the size of the fourth region 240 on which the instant message related to the video object 332 is displayed changes according to the change of the size of the third region 230.

When the size of the third region 230 changes into the size of the first region 210, for example, the full screen, the controller 180 may cause the instant messages related to the video object 332 to overlap with the region where the video object 332 is output.

In this case, these instant messages are displayed with transparency to make the video object 332 distinguishable.

In addition, in this embodiment, the description has been made to a case in which one first icon is selected in the second region 220, but a plurality of first icons may be selected in the second region 220. In this case, the controller 180 may change the object, output to the third region 230, to display the objects corresponding to the plurality of first icons selected on the basis of touch input to the third region 230.

With reference to FIG. 4B, the controller 180 may set to output one first icon, selected by user among the first icons displayed on the second region 220, to the first region 210.

In this case, the video object 332 is output to the first region 210 in full screen. The instant messages 351 to 354 related to the video object 332 are displayed, overlapping over the output object. In this case, a control bar 250 is displayed on the display unit 151 in order to control the transparency of the instant messages. The user can control the transparency of the instant messages by using the control bar 250.

In addition, whether or not to output the instant messages to be displayed over the object may be determined according to a user's selection. An on/off button that is used to determine whether or not to output the instant messages is displayed on the display unit 151, so that the user can determine whether or not to output the instant messages by using the on/off button.

Referring to FIG. 4C, the controller 180 (see FIG. 1) may output the video object 332 corresponding to the object corresponding to one first icon selected by the user among the first icons displayed on the second region 220 to a popup window 260 to separate the video object 332 from the first region 210.

Here, the instant messages 351 to 354 related to the video object 332 are displayed on the first region 210, while the video object 332 is output to the popup window 260.

The popup window 260 is determined according to the attributes of the selected objects. For example, if the object is a video or an audio file, an output window where a medial file can be played is popped up, and if the object is a text containing link information, a web browser window is output.

In addition, if a plurality of first icons are selected in the second region 220, the controller 180 may create a plurality of popup windows 260 to separately display the objects corresponding to the first icons selected.

The method of displaying the objects corresponding to the first icons, selected in the second region 220, on the first region 210 or the popup window 260 have been described.

A method of changing the objects displayed on the first region 210 or the popup window 260 and the instant messages related to the objects will now be described.

FIG. 5 is a conceptual view illustrating a method of changing objects in the mobile terminal according to the exemplary embodiment disclosed in this specification.

The mobile terminal according to this embodiment may change the object, output to the first region 210 (see FIGS. 4A and 4B) or the popup window 260 (see FIG. 4), to another object on the basis of a user's selection.

A method of changing objects in connection with FIG. 5 is described herein with an example of the method of outputting the objects in connection with FIG. 4A. However, the method of changing objects in connection with FIG. 5 can also be applied to the method of outputting the objects in connection with FIGS. 4B and 4C.

As described in FIG. 4A, in FIG. 5, the video object 332 corresponding to one first icon selected in the second region 220 (see FIG. 4A) is output to the third region 230, and the instant messages related to the video object 332 are displayed on the fourth region 240.

The object output to the third region 230 may be changed to another object according to a user's touch input with respect to the second region 220 or by a change button shown on one region of the display unit 151.

For example, when a user's touch input is sensed in the third region 230, the video object 332 output to the third region 230 may be changed to another object 335.

In this case, the controller 180 changes a chat unit of the fourth region 240 so that the instant messages 351 and 352 displayed on the fourth region 240 related to the video object 332 output to the third region 230 can be changed to instant messages 361 and 362 related to the object 335 output to the third region 230.

In addition, the controller 180 groups the objects corresponding to the information displayed on the second region 220 (see FIG. 4A) according to predetermined specifications such as the formats of the objects, sending order, and senders, so that the objects displayed on the third region 230 can be changed within a group.

For example, as shown in 5, when the video object 332 output to the third region 230 is changed to another object according to a user's touch input, the video object 332 may be changed to the video object 335 that has the same file format as the video object 332.

In addition, when the chat partner B has sent the video object 335, the video object 332 may be changed to another object 336 in the third region 230 sent by the chat partner B 312.

As such, the controller 180 may change one object to another object having the same attribute in the same group in the third region 230. In addition, the specifications in terms of changing the objects may be varied by the user's setup.

In addition, an object to be output to the third region 230 may be changed to another object according to a user's touch input. For example, as shown in FIG. 5, one object may be changed to another object by touch input such as flicking or dragging that is input in a certain direction to the third region 230 or by predetermined touch input such as single touch or double touch.

The controller 180 may change an object to be output to the third region 230 to other objects that belong to different groups according to the kinds of touch input.

For example, as shown in 5, when a flicking touch input is made in a first direction (for example, a horizontal direction) in the third region 230, the controller 180 outputs the video object 335 having the same file attribute as the video object 332, output to the third region 230, to the third region 230. In addition, when a flicking touch input is made in a second direction (for example, a vertical direction) in the third region 230, the controller 180 outputs another object sent by the same chat partner who has sent the video object 335, output to the third region 230, for example, the object 336 sent by the chat partner B 312 to the third region 230.

That is, when a flicking touch input in the horizontal direction is sensed controller 180, the controller 180 outputs another object having the same file format as the object to the third region 230. When a flicking touch input in the vertical direction is sensed, the controller 180 outputs another object sent by the same sender to the third region 230. Also, objects, output to the third region 230, may be changed in a various manner based on various specifications including sending order and various touch inputs such as single touch or double touch.

Next, a method of outputting a new instant message if the new instant message is received at the mobile terminal while older objects or instant messages are being viewed according to a user's selection will now be described in connection with FIG. 6A.

Figure 6A:
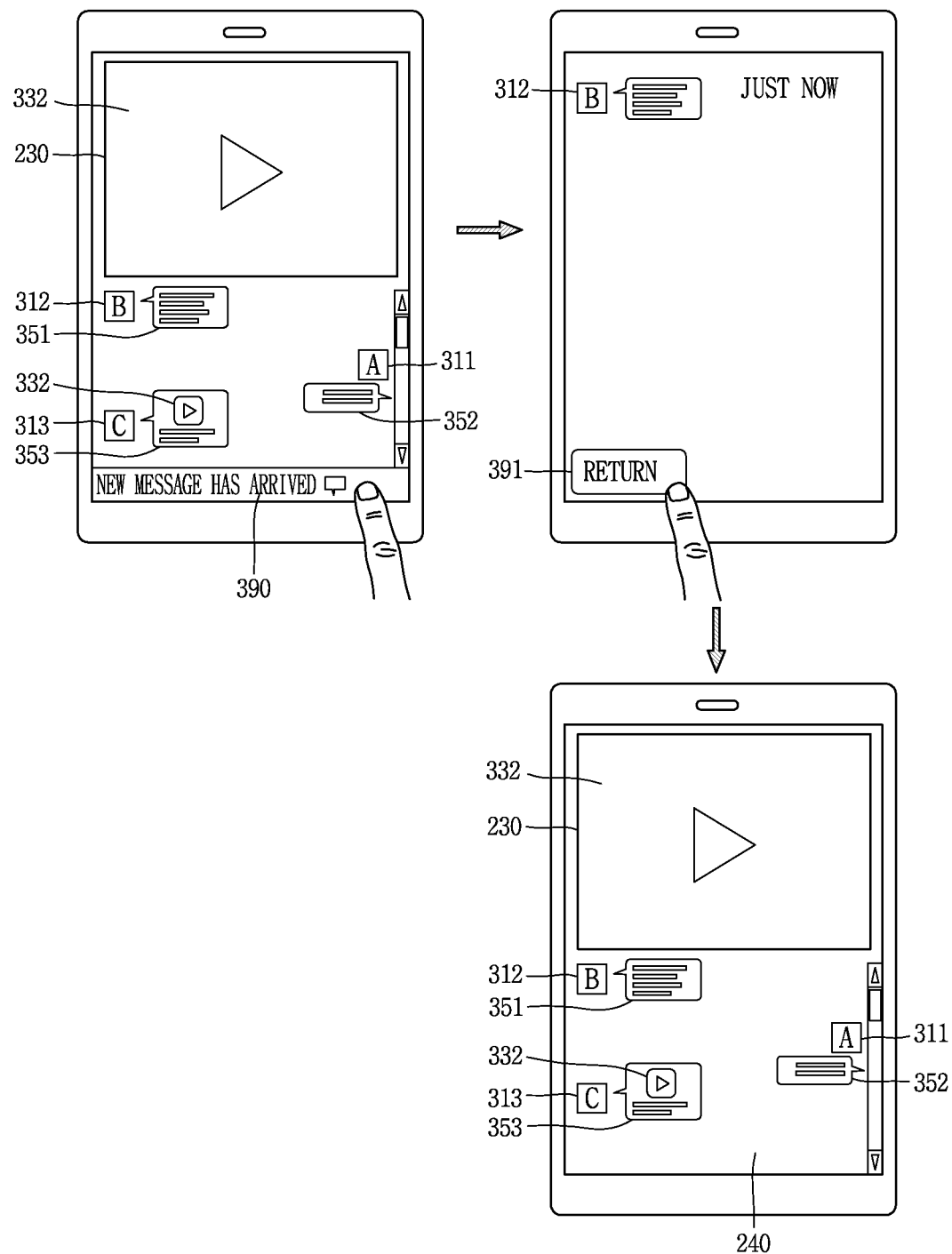
FIGS. 6A and 6B are conceptual views illustrating a method of changing an output range in a mobile terminal according to an exemplary embodiment disclosed in this specification.

FIG. 6A is a conceptual view illustrating a method of changing an output range in the mobile terminal according to the exemplary embodiment disclosed in this specification.

For example, as shown in FIG. 4A, the case in which one first icon is selected from the first icons in the second region 220, the video object 332 corresponding to the selected first icon 345 is output to the third region 230, and the video object 332 and the instant messages related to the video object 332 are output to the third region 230 and the fourth region 240, respectively, will be described.

The controller 180 according to the embodiment of this invention changes the output range of the first region 210 when the mobile terminal gets a new instant message while displaying the object corresponding to the first icon selected in the second region 220 and the instant messages related to the selected first icon so that the user can use the new instant message.

If the new instant message is received, the controller 180 may automatically change the output range to the region in which the new instant message is received or convert to the region in which the new instant message is displayed through an icon for the new instant message.

As shown in FIG. 6A, if a new instant message 381 is received while the instant message on "June 21 around 15:00", when the video object 332 was sent, is being displayed on the fourth region 240, the controller 180 displays a second icon 390 indicating that the new instant message 381 has arrived on a region of the display unit 151.

In addition, if the second icon 390 is selected by the user, the controller 180 stops outputting the video object 332 and the instant messages related to the video object 332 and changes the output range of the first region 210 to output the new instant message 381.

In another embodiment, if the second icon 390 is selected, the controller 180 may keep outputting the video object 332 to the third region 230 and display the new instant message 381 on the fourth region 240 instead of the instant messages related to the video object 332.

In addition, if the output range is changed to display the new instant message, the controller 180 may display an icon 391 on an area of the first region 210 so that the user can use the video object 332 and the instant messages having been displayed before the new instant message is displayed. When the icon 391 is selected by the user, the controller 180 changes the output range to display the video object 332 and the instant messages having been output before the new instant message is displayed.

FIG. 6A is a conceptual view illustrating a method of changing an output range in the mobile terminal according to the exemplary embodiment disclosed in this specification.

Figure 6B:
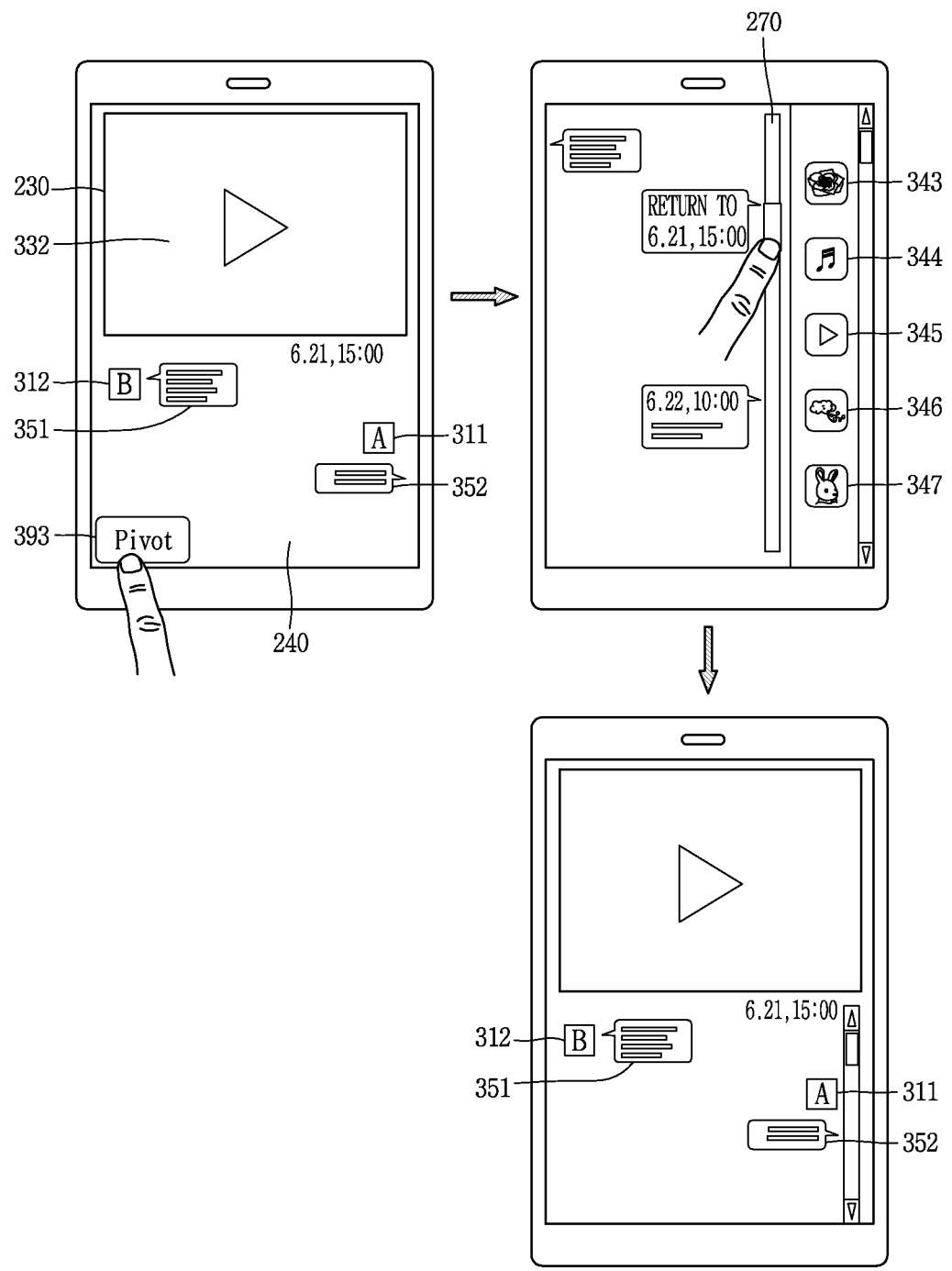

With reference to FIG. 6B, the mobile terminal according to the exemplary embodiment of the invention may set to output again a region in which an object and instant messages related thereto are currently being displayed on the first region 210.

The controller 180 displays an icon 393 that remembers the current output range on a certain region of the display unit 151, and remembers the video object 332 and the instant messages that are currently being output when the icon 393 is selected by the user.

For example, while the user is viewing the video object 332 and the instant messages sent on "June 21 around 15:00" in the third region 230 and the fourth region 240, if the user wants to view the video object 332 and the instant messages again, the user selects the icon 393. A mark 394 indicating where the video object 332 and the instant messages are included is then displayed on a scroll bar 270 of the display unit 151. In addition, regardless of the instant messages currently being displayed, when the mark 394 is selected by the user, the output range is changed so that the video object 332 and the instant messages sent on June 21 around 15:00 can be displayed on the first region 210.

Herein, the mark 394 may be displayed on an arbitrary region of the display unit 151 as well as on the scroll bar 270.

In this manner, the controller 180 remembers a region where the instant messages the user wants to use again are included, and returns to the region according to the user's selection.

A method of using keyword information included in an object in the mobile terminal according to the exemplary embodiment of the invention will now be described.

Figure 7:
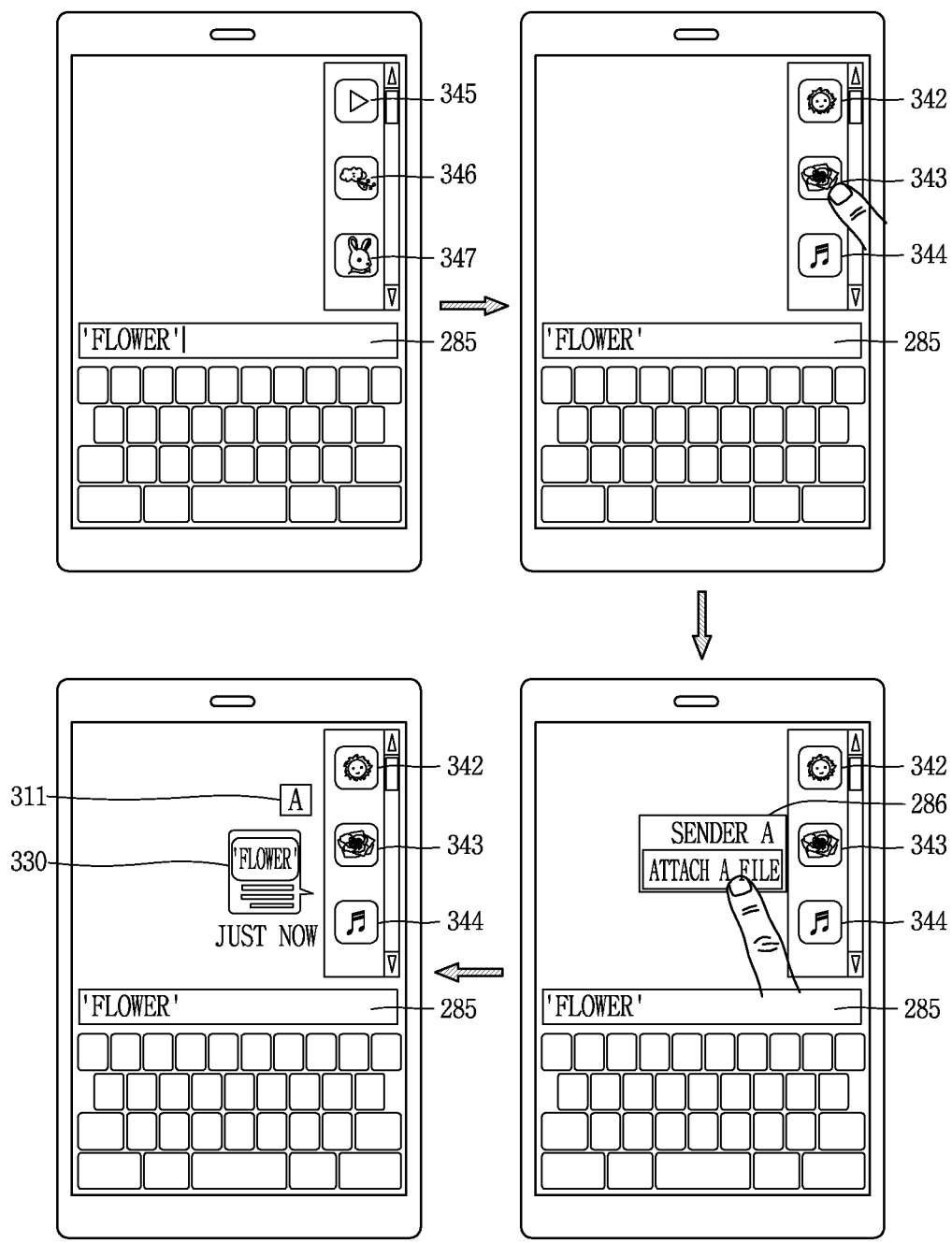
FIG. 7 is a conceptual view illustrating a method of using a keyword in a mobile terminal according to an exemplary embodiment disclosed in this specification.

FIG. 7 is a conceptual view illustrating a method of using a keyword in a mobile terminal according to an exemplary embodiment disclosed in this specification.

An object included in an instant message that is sent to a mobile terminal according to an exemplary embodiment disclosed in this specification may include a keyword.

Therefore, information corresponding to an object that is displayed on the second region 220 and included in the instant message may include the keyword.

Here, a keyword refers to information related to an object and comprises a text that summarizes the object. In addition, that a keyword is included in the object may also be expressed as that "information related to the object is tagged."

A tag is a kind of group of keywords to which words representing features, meanings, and titles of objects are input. Tag information may be input per object by the user, or tag information may be automatically included in an object even when the user does not input the tag information. Also, the tag information may be expressed as metadata. Here, metadata refers to, for example, data that describe an image object and are used to efficiently search the tag or keyword information.

Therefore, the detector 181 (see FIG. 1) may extract the keyword included in the object at the same time as detecting the object, and the controller 180 may display the extracted keyword along with the first icons displayed on the second region 220.

In addition, as shown in FIG. 7, when a text that coincides with the keyword is input by the user to a message input window 285, the controller 180 recommends an object including the keyword to the user so that the user can easily obtain information about the object.

For example, if a word "flower" is input to the message input window 285 by the user, the controller 180 changes the output range of the second region 220 so that a first icon (image icon 343) corresponding to the object including the keyword "flower" can be displayed on the second region 220.

When the object is selected by the user, for example, when the image icon 343 is dragged to the message input window 285 or "attach a file" is selected in a selection window 286, the controller 180 sends the object (image 330) corresponding to the image icon 343 to another mobile terminal.

As described above, it is easy to find an object by using keyword information in the mobile terminal according to the exemplary embodiment of the invention.

The second region in which information corresponding to an object included in an instant message is displayed will now be described in detail.

Figure 8A:
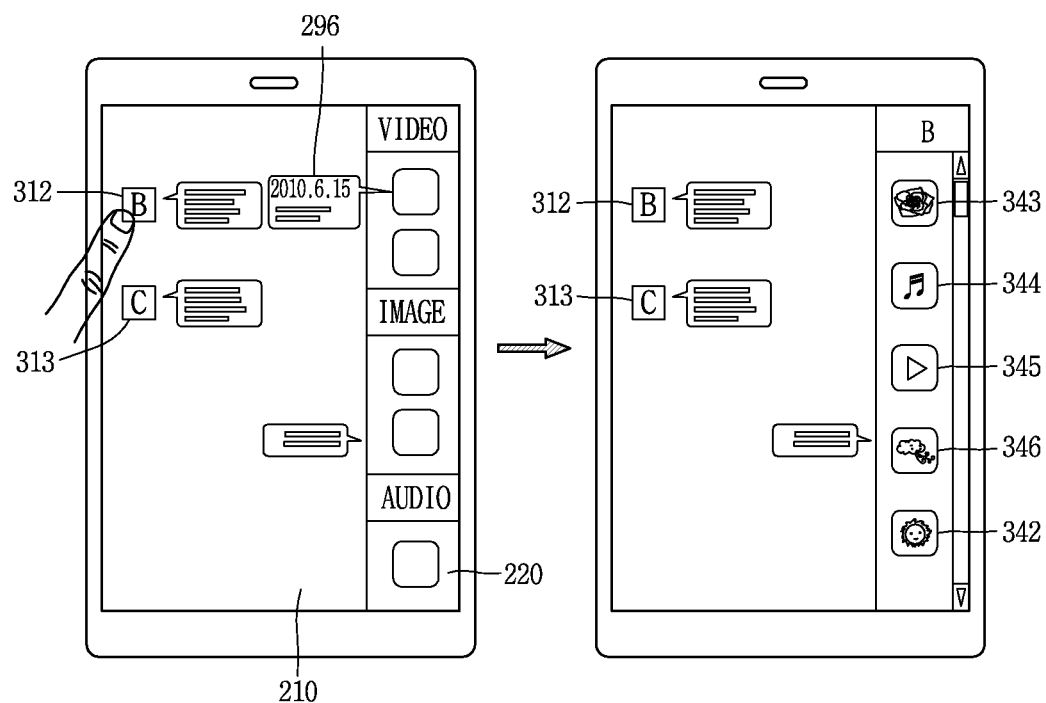
FIGS. 8A, 8B, and 9 are conceptual views illustrating information corresponding to objects detected in a mobile terminal according to an exemplary embodiment disclosed in this specification.
Figure 8B:
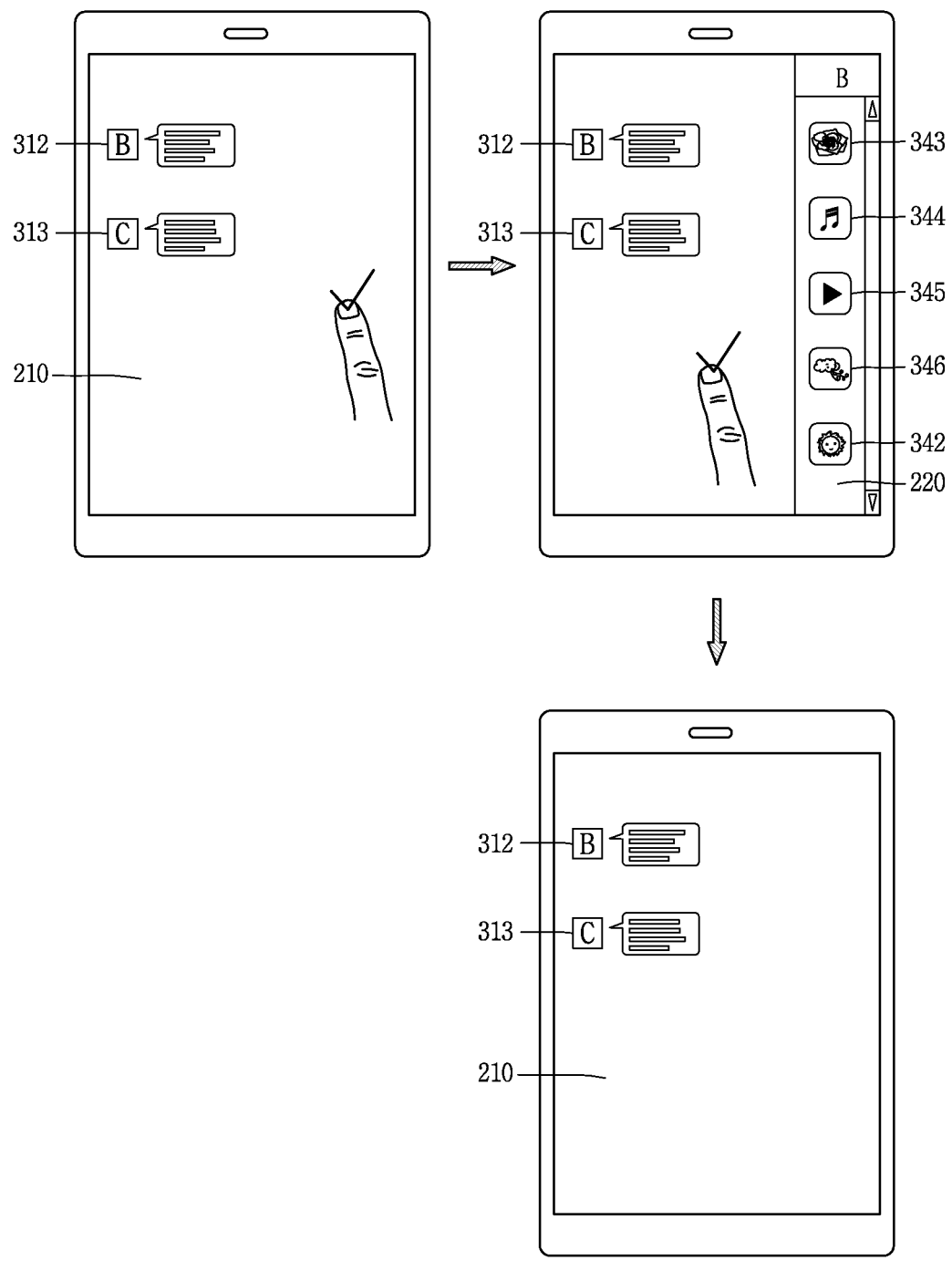
Figure 9:
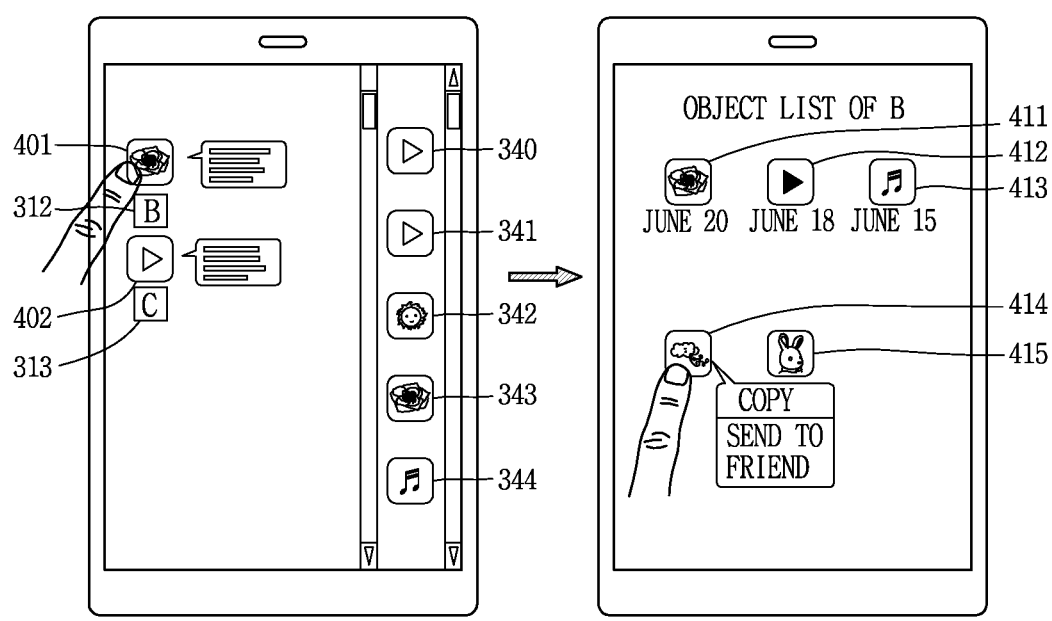

FIGS. 8A, 8B, and 9 are conceptual views illustrating information corresponding to an object that is detected in a mobile terminal according to an exemplary embodiment of the invention.

First, as described above, the second region 220, shown in FIG. 8A, is a region where information corresponding to an object in an instant message is displayed. Information such as an icon, a keyword, or a thumbnail image that represents the object is displayed on the second region 220.

Information corresponding to objects included in instant messages displayed in a plurality of chat regions (for example, chat rooms) or information corresponding to objects that were sent or received in the past may be displayed on the second region 220.

First, if touch input is sensed with respect to one piece of information (for example, first icon 345) from the information displayed on the second region 220, the controller 180 (see FIG. 1) may provide a detailed information window 296 about the information displayed. Information about the video object 332 related to the first icon 345, date when the object was sent, a sender who sent the object, or another object sent along with the object may be provided though the detailed information window 296.

In addition, as shown in FIG. 8A, the information displayed on the second region 220 may be arranged according to predetermined specifications. For example, the information may be displayed according to the specifications such as the file formations of the objects corresponding to the information, a sender, sent date, or sending order.

Inn addition, the controller 180 may display information corresponding to objects sent by individual chat partners in the second region or display information corresponding to objects sent by a chat partner based on a user's selection.

For example, as shown in FIG. 8A, if the chat partner B 312 is selected in the first region 210 by the user, the controller 180 displays information corresponding to objects including videos, audios, and pictures, sent by the chat partner B 312 in the second region 220.

As shown in FIG. 8B, the second region 220 may remain displayed on the display unit 151 or may be displayed based on touch input that is sensed in one region of the display unit 151. In addition, the second region 220 may be set to disappear when touch input is sensed with respect to a region of the display unit 151, for example, the outside of the second region 220.

As such, the controller 180 may set to output the second region 220 only when the user needs the second region 220 and expand the second region 220 when an object is output or an instant message is displayed.

In addition, as shown in FIG. 9, the controller 180, included in the mobile terminal according to this embodiment, may display information about the last objects sent by individual chat partners on third icons 401 and 402 that represent information about the chat partners (or transmitters or senders) who have written instant messages.

In addition, when one third icon is selected by the user among the third icons, the controller 180 may display information 411 to 416 about the objects sent by the chat partner B corresponding to the selected third icon 401 on a new window or include the information 411 to 416 in profile information of the chat partner B.

A method of downloading objects in instant messages that are sent to a mobile terminal according to an exemplary embodiment of the invention will now be described.

Figure 10:
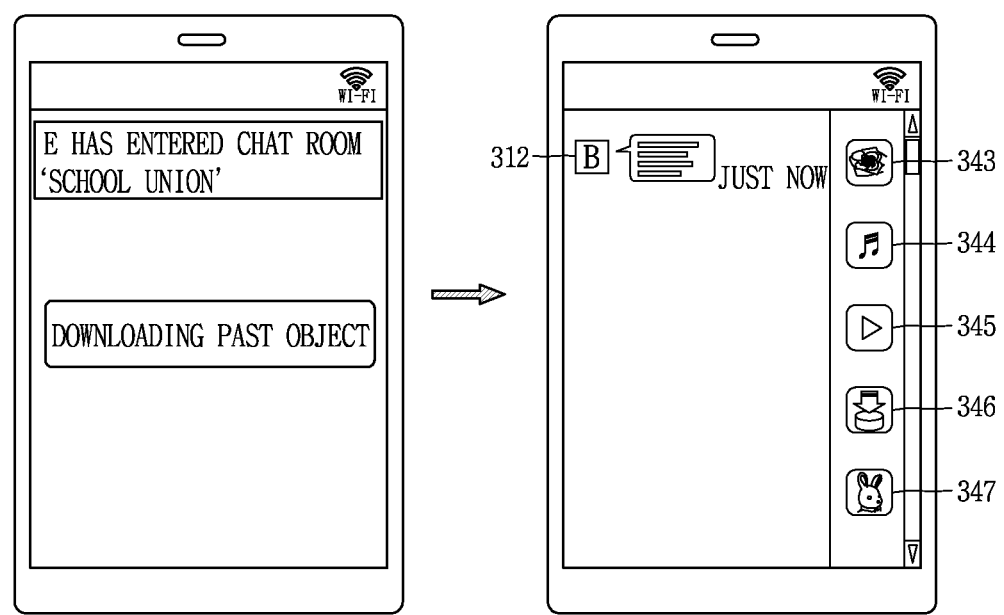
FIG. 10 is a conceptual view illustrating a method of downloading an object in a mobile terminal according to an exemplary embodiment disclosed in this specification.

FIG. 10 is a conceptual view illustrating a method of downloading objects in a mobile terminal according to an exemplary embodiment disclosed in this specification.

Objects included in instant messages that are sent to the mobile terminal may need to be downloaded according to types of objects.

When the mobile terminal according to this embodiment is in Wi-Fi (Wireless LAN) mode, the controller 180 according to this embodiment may set to automatically download video objects, audio objects or image objects while the user does not separately select and download them.

In addition, as shown in FIG. 10, when a new chat partner is invited to or enters a chat area (for example, chat room) in which two or more chat partners exchange instant messages, if the mobile terminal is in Wi-Fi (Wireless LAN) mode, objects sent in the past in the chat area may be automatically downloaded, and information about the downloaded objects may be displayed on the second region 220.

As such, in Wi-Fi mode, the mobile terminal according to this embodiment can reduce inconvenience of separately downloading objects.

As described above, according to the mobile terminal and the control method thereof according to the exemplary embodiment of the invention, objects included in instant messages are displayed on a particular region, thereby providing the user with intuitive information about the objects.

Also, according to the mobile terminal and the control method thereof according to the exemplary embodiment of the invention, an object selected by the user among the objects displayed on a particular region can be displayed along with related instant messages, thereby providing the user with relevant information.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a memory configured to store a message application for messaging in a chat room;
   a wireless communication unit configured to communicate messages and objects;
   a touchscreen configured to display at least one message and at least one icon corresponding to at least one object communicated in a specific chat room of the message application in a first area of the touchscreen; and
   a controller configured to cause the touchscreen to display information corresponding to the at least one object in a second area of the touchscreen in response to a touch input received via the touchscreen on which the at least one message and the at least one icon are displayed,
   wherein the displayed information is related to only the at least one object communicated in the specific chat room, and the at least one message is not displayed in the second area of the touchscreen displaying the information.

2. The mobile terminal of claim 1, wherein the information is displayed as an icon or a thumbnail.

3. The mobile terminal of claim 2, wherein the information is displayed as the thumbnail when the at least one object is video.

4. The mobile terminal of claim 2, wherein the at least one object is displayed when the icon or the thumbnail is selected.

5. The mobile terminal of claim 4, wherein the controller is further configured to cause the touchscreen to display another object in response to dragging of the displayed at least one object on the touchscreen.

6. The mobile terminal of claim 1, wherein the controller is further configured to cause the touchscreen to display a detailed information window about the at least one object.

7. The mobile terminal of claim 6, wherein the detailed information window comprises at least a date when the at least one object was sent or a sender who sent the at least one object.

8. The mobile terminal of claim 1, wherein the at least one message and the at least one icon are displayed in a first region of the message application and the information is displayed in a second region of the message application.

9. A method of displaying information in a mobile terminal executing a message application, the method comprising:
communicating messages and objects in a specific chat room of the message application;
displaying, in a first area of a touchscreen of the mobile terminal, at least one message and at least one icon corresponding to at least one object communicated in the specific chat room; and
displaying, in a second area of the touchscreen, information corresponding to the at least one object in response to a touch input received via the touchscreen on which the at least one message and the at least one icon are displayed,
wherein the displayed information is related to only the at least one object communicated in the specific chat room, and the at least one message is not displayed in the second area of the touchscreen displaying the information.

10. The method of claim 9, wherein the information is displayed as an icon or a thumbnail.

11. The method of claim 10, wherein the information is displayed as the thumbnail when the at least one object is video.

12. The method of claim 10, wherein the at least one object is displayed when the icon or the thumbnail is selected.

13. The method of claim 12, further comprising displaying, on the touchscreen, another object in response to dragging of the displayed at least one object on the touchscreen.

14. The method of claim 9, further comprising displaying, on the touchscreen, a detailed information window about the at least one object.

15. The method of claim 14, wherein the detailed information window comprises at least a date when the at least one object was sent or a sender who sent the at least one object.

16. The method of claim 9, wherein the at least one message and the at least one icon are displayed in a first region of the message application and the information is displayed in a second region of the message application.

17. A non-transitory computer readable medium storing a set of instructions, when executed by a processor of a mobile terminal, causes the processor to perform:
communicating messages and objects in a specific chat room of the message application;
displaying, in a first area of a touchscreen of the mobile terminal, at least one message and at least one icon corresponding to at least one object communicated in the specific chat room; and
displaying, in a second area of the touchscreen, information corresponding to the at least one object in response to a touch input received via the touchscreen on which the at least one message and the at least one icon are displayed,
wherein the displayed information is related to only the at least one object communicated in the specific chat room, and the at least one message is not displayed in the second area of the touchscreen displaying the information.

18. The non-transitory computer readable medium of claim 17, wherein the information is displayed as an icon or a thumbnail.

19. The non-transitory computer readable medium of claim 18, wherein the information is displayed as the thumbnail when the at least one object is video.

20. The non-transitory computer readable medium of claim 18, wherein the at least one object is displayed when the icon or the thumbnail is selected.

21. The non-transitory computer readable medium of claim 20, wherein the processor is caused to further perform displaying, on the touchscreen, another object in response to dragging of the displayed at least one object on the touchscreen.

22. The non-transitory computer readable medium of claim 17, wherein the processor is caused to further perform displaying, on the touchscreen, a detailed information window about the at least one object.

23. The non-transitory computer readable medium of claim 22, wherein the detailed information window comprises at least a date when the at least one object was sent or a sender who sent the at least one object.

24. The non-transitory computer readable medium of claim 17, wherein the at least one message and the at least one icon are displayed in a first region of the message application and the information is displayed in a second region of the message application.

* * * * *